United States Patent
Garrido-Lopez

(10) Patent No.: US 9,213,335 B2
(45) Date of Patent: Dec. 15, 2015

(54) METHOD FOR CONTROLLING AIRCRAFT TIME OF ARRIVAL

(71) Applicant: The Boeing Company, Chicago, IL (US)

(72) Inventor: David Garrido-Lopez, Tres Cantos (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/613,101

(22) Filed: Feb. 3, 2015

(65) Prior Publication Data

US 2015/0277441 A1    Oct. 1, 2015

(30) Foreign Application Priority Data

Mar. 25, 2014 (EP) .................................. 14382101

(51) Int. Cl.
- *G05D 1/02* (2006.01)
- *G01C 21/00* (2006.01)
- *G08G 5/00* (2006.01)
- *G05D 1/00* (2006.01)

(52) U.S. Cl.
CPC ............ *G05D 1/0202* (2013.01); *G05D 1/0005* (2013.01); *G08G 5/0039* (2013.01); *G08G 5/0052* (2013.01)

(58) Field of Classification Search
CPC ......... G05D 1/02; G05D 1/0202; G08G 5/00; G08G 5/0039; G01C 21/00; B64C 19/00
USPC ............... 701/3, 4, 16, 18, 120; 340/945, 970
See application file for complete search history.

(56) References Cited

U.S. PATENT DOCUMENTS

| | | | | |
|---|---|---|---|---|
| 8,311,687 B2 * | 11/2012 | Bakker | ................ | G05D 1/0005 244/182 |
| 8,386,174 B2 * | 2/2013 | Coulmeau | .............. | G06Q 10/04 340/994 |
| 2004/0225432 A1 * | 11/2004 | Pilley | ..................... | G01C 23/00 701/117 |
| 2010/0114407 A1 | 5/2010 | Klooster et al. | | |
| 2010/0131125 A1 | 5/2010 | Blanchon et al. | | |
| 2010/0217510 A1 * | 8/2010 | Deker | ................... | G08G 5/045 701/120 |

FOREIGN PATENT DOCUMENTS

EP    0 637 787 A1    2/1995

OTHER PUBLICATIONS

European Search Report application No. EP 14382101.5-1802 dated Nov. 9, 2014.

* cited by examiner

*Primary Examiner* — Tan Q Nguyen
(74) *Attorney, Agent, or Firm* — Miller, Matthias & Hull LLP

(57) ABSTRACT

A method for controlling aircraft time of arrival at a flight trajectory waypoint decouples the various parts of the flight for flight plan, speed scheduling, and trajectory predictions. Adjustments to the speed during a first cruise phase of the flight reduce the deviations between the actual and estimated arrival times throughout the flight, and particularly reduce the amount of speed adjustments necessary during the later descent phase.

17 Claims, 7 Drawing Sheets

METHOD FOR CONTROLLING AIRCRAFT TIME OF ARRIVAL

BACKGROUND

1. Technical Field

The present disclosure generally relates to a method for controlling aircraft time of arrival, for example to control the time of arrival of the aircraft at a flight trajectory waypoint.

2. Description of the Related Art

Traditionally, most commercial aircraft have a Required Time of Arrival (RTA) function built into the flight control systems of the aircraft. The RTA function controls the altitude and speed so that the aircraft reaches a target waypoint (or a plurality of target waypoints) at a commanded time (or times) known as Required Time(s) of Arrival (RTA). For instance, Scheduled Time(s) of Arrival (STA) at certain target waypoint(s) may be established by an arrival management (AMAN) system for each aircraft arriving to a particular airport, so that aircraft are suitably separated in space and time between each other at each of the target waypoint(s). STAs may also be established by an Airline Operating Center so that the airline orchestrates the arrivals of its flights. Furthermore, pilots themselves may schedule arrival times of their election in some occasions. For instance, they may advance arrival times in order to overcome flight delays, and so force the aircraft to adopt faster speeds.

A target waypoint and its corresponding RTA may be either manually inputted to the flight management computer (FMC) of the aircraft or, alternatively, may be automatically uploaded. In each case, an RTA that is equal to the STA is inputted to the FMC. In the exemplary case that the aircraft operates under AMAN supervision, it is required to take necessary measures to reach each waypoint at the AMAN mandated STAs. For example, the trajectory may be altered by adjusting the aircraft speed, stretching the aircraft flight path, staying in a holding pattern, and so forth.

RTA control in existing commercial aircraft is achieved through an iterative determination of an Estimated Time of Arrival (ETA) of the aircraft at the target waypoint. When the ETA falls outside of an acceptable range of values around the RTA, the FMC searches for a new trajectory that implies an ETA equal to the RTA at the target waypoint (within a given small tolerance). The maximum value of acceptable |RTA−ETA| error is referred to herein as Difference Threshold (DT).

Presently, the appropriate trajectory is identified on the basis of a single coupling variable such as Cost Index (CI), applied across the various stages of the flight (climb, cruise, descent). Cost Index is a numerical parameter that is indicative of a ratio of the cost of the aircraft being in the air (the longer the flight, typically the higher the operating costs) versus the cost of fuel while the aircraft is flying. The CI is most easily understood by considering its limits: at CI=0, the FMC calculates the most fuel efficient trajectory possible, regardless of how long the flight will then take. For maximum CI, on the other hand, the FMC mandates maximum flight envelope speeds, regardless of fuel cost. Hence, CIs between these extremes define different trade-offs between fuel costs and flight times.

Different AMANs, whether operative or still in conceptual or development stages, consider in one way or another a horizon at which the AMAN freezes the STA calculation. The distance of this horizon to the arrival airport typically ranges from 200-300 nautical miles (NM). Along with this, for a high altitude (>30,000 ft) cruising flight, the distance from top of descent (TOD) to touchdown at the airport may be around 100-150 NM. Also, the target waypoint such as an initial approach fix (IAF) may be around 50 NM from touchdown. Thus, current RTA guidance strategies may include anywhere between 50 and 200 NM of aircraft travel at a cruising altitude and 50-100 NM of descent to the airport.

FIG. 1A illustrates an exemplary flight trajectory (vertical profile) of an aircraft from a waypoint (d=zero) during the cruise phase, through to arrival at a destination airport in excess of 300 NM later. TOD is some 125 NM from the airport.

FIG. 1B illustrates, for the same flight trajectory, a time deviation (vertical axis) between the Actual Times of Arrivals (ATAs) and the initially Estimated Times of Arrivals (ETAs) at every simulated point along the trajectory. This deviation is not the same as the (RTA−ETA) error calculated for the target waypoint. It is a variable that indicates how the aircraft is deviating from the initially predicted trajectory. It will be noted that the deviation (which is zero at the initial waypoint in the cruise phase) increases over the course of the cruise phase reaching a maximum of TOD. In part, this (uncorrected) drift may be a result of wind and temperature prediction errors that affect the aircraft groundspeed. This in turn results in a temporally unpredictable time difference shift. A significant correction to the descent speed/altitude is then needed in order to arrive at the target waypoint on time, which is inefficient in time and/or fuel.

Accordingly, there is a need for an improved method for controlling the aircraft so that the aircraft better follows the commanded flight trajectory, that is, the absolute values of the ATAs minus the ETAs are minimized throughout the flight.

SUMMARY OF THE DISCLOSURE

The disclosure provides a method for controlling the time of arrival of an aircraft at a waypoint.

The disclosure is based upon the realization that attempting to control the aircraft by considering the flight trajectory as a whole results in the control in the first flight phase—the cruise phase and, optionally, a first part of the descent phase as well—being less than optimal. Specifically, when speeds for cruise and descent are simultaneously coupled by a CI or other coupling variable, the range of speed variation of the aircraft in the cruise phase is much smaller than for the descent phase. The consequence of this is that there is very limited scope for significant speed adjustments during the cruise phase.

By decoupling the various parts of the flight for the flight plan, speed scheduling and trajectory predictions, it is possible to implement adjustments in the cruise phase so as to allow potentially significant corrections to the aircraft speed relatively early on in the flight trajectory. Cruise phase speed adjustments can reduce the deviations between the actual and the estimated arrival times throughout the flight, and, beneficially, also reduce the required descent speed adjustments. Moreover, implementation of the method of the invention may be achieved through reconfiguration of the speed scheduling logic in the FMC, for example, so that the implementation costs (software reprogramming) are anticipated to be low.

In one embodiment, the first flight phase is the cruise phase, and the second flight phase is the descent phase.

In an alternative embodiment, however, the first flight phase may be both the cruise phase and also a first part of the descent phase as well. The majority of commercial flights use cruise levels close to 9,100 meters (30,000 feet) or higher, and use the so called "Mach" mode during the cruise phase of flight, wherein the aircraft airspeed is specified as a Mach number. Aircraft also fly in Mach mode during, say, the first 25% of the descent phase as well (i.e., the first 25% or so of the distance from TOD to the target waypoint). Advantageously, therefore, the first flight phase corresponds with the cruise phase and that first part of the descent phase wherein the aircraft flies in Mach mode.

During the remaining 75% or so of the distance from TOD to the target waypoint, the aircraft might fly in Calibrated Air Speed (CAS) mode. In this embodiment, the second flight phase may correspond with the part of the aircraft's descent that is in CAS mode.

The threshold value DT may be variable over the course of the flight, such that, early on in the cruise phase, the difference between the RTA and ETA may be allowed to be relatively large before flight speed adjustments are mandated, whereas an increasingly small permissible DT may be employed as the aircraft approaches TOD and the target waypoint. Thus a profile of DT plotted against distance from target waypoint has a "funnel" shape.

In a particular embodiment, however, DT is held constant across at least a part of, and in some applications across substantially the whole of, the flight trajectory (during both the first and second phases of the flight). This results in more adjustments to the aircraft speed early on during the flight trajectory than would be the case with a variable (tapered or funnel shaped DT), so that it is counterintuitive to place a tighter restriction on DT during the first flight phase. However it has been realized that speed adjustments during the first flight phase—which corresponds with the cruise phase and, optionally, a first part of the descent phase as well—are easy to execute (as long as the commanded speeds are flyable); all that is needed is a change of thrust. Speed adjustments in the second flight phase (all—or the majority of—the descent phase) are, by contrast, more difficult as they require modification of both speed and vertical position.

The disclosure also extends to a computer program having program code which, when executed, carries out the method of the invention.

A Flight Management System loaded with such a computer program is also provided.

In summary, therefore, the method disclosed increases the probability of the aircraft reaching any arrival point along the operation at a time close to the initial predicted time. The aircraft trajectory becomes more accurate and predictable at any intermediate waypoint (of the situation illustrated in FIG. 1B), and not just at the final target waypoint.

Further features are set out in the dependent claims.

BRIEF DESCRIPTION OF THE DRAWINGS

For a more complete understanding of the disclosed methods and apparatus, reference should be made to the embodiments illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Figure 1A:
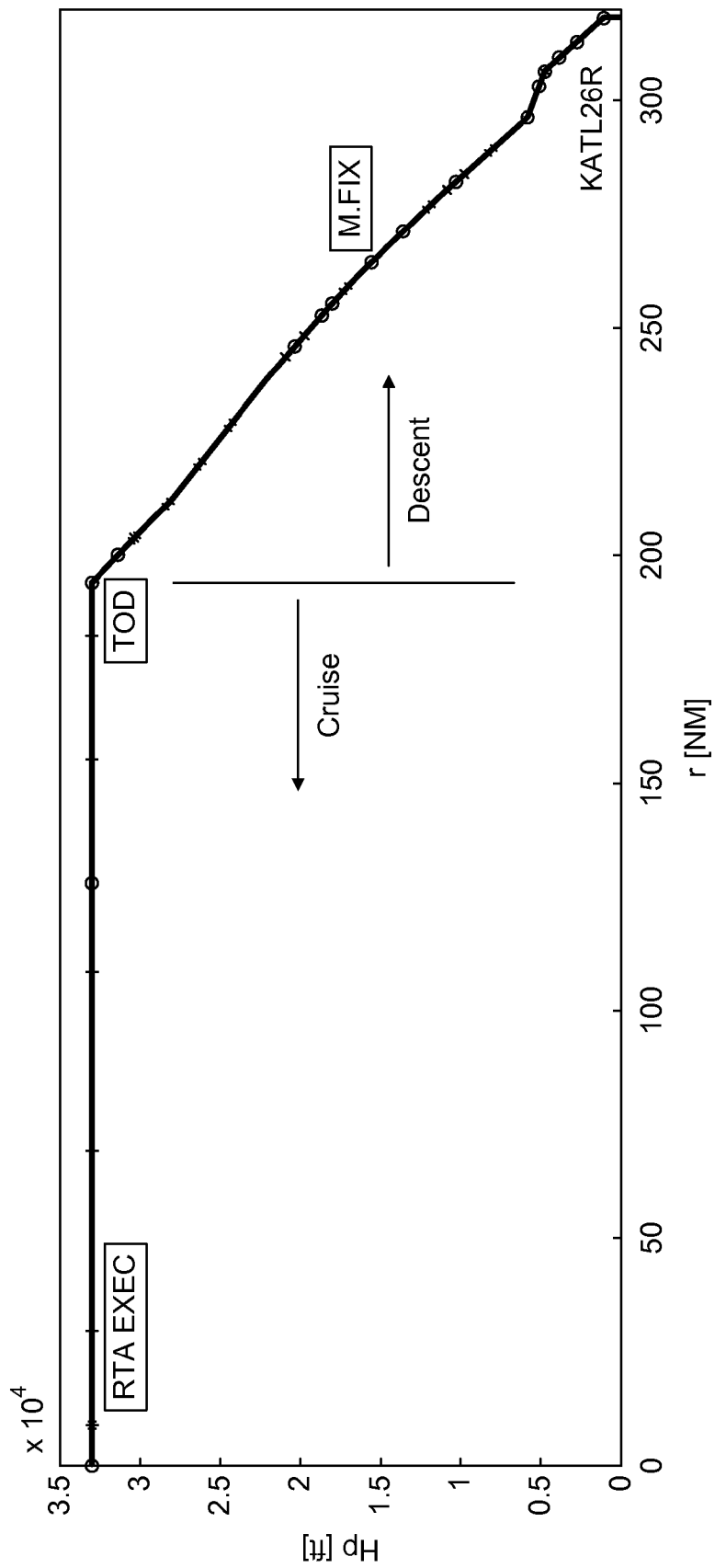
FIG. 1a shows a plot of flight altitude versus distance from an arbitrary origin during a cruise phase, to a metering fix and onwards to touchdown following a descent phase of an aircraft flight trajectory.
Figure 1B:
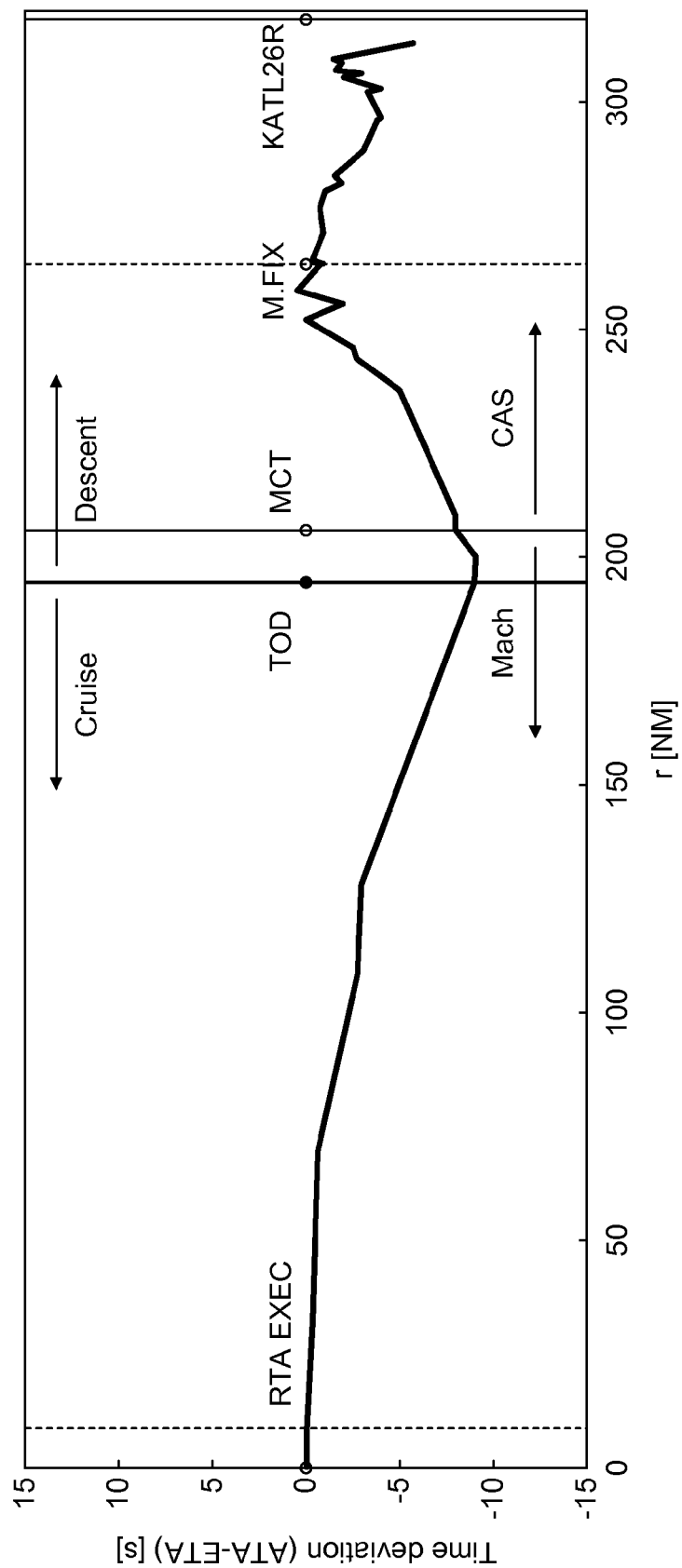
FIG. 1b shows a plot of time deviation between the Estimated Times of Arrival (ETAs) according to the first trajectory prediction and Actual times of Arrivals (ATAs), versus distance from the arbitrary origin of FIG. 1a, through to the metering fix and touchdown, for a prior art flight control algorithm.
Figure 2:
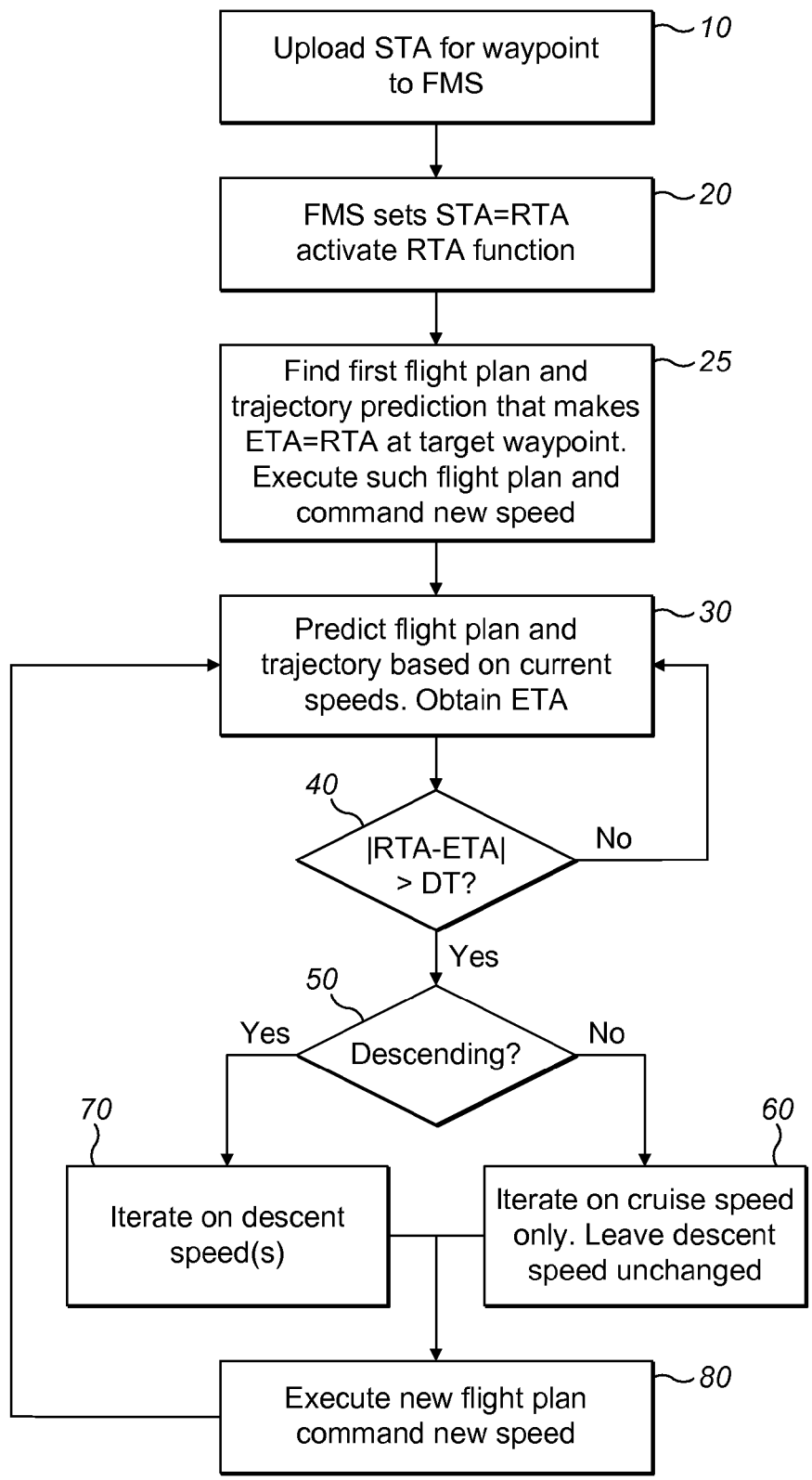
FIG. 2 shows a flow chart of a method for controlling the arrival of an aircraft at a target waypoint, in accordance with a first exemplary embodiment.

Referring first to FIG. 2, a flow chart of a first embodiment of a method for controlling the time of arrival of an aircraft at a target waypoint is shown. The method may be implemented, for example, by modifying the software within the Flight Control System (FMC) of a commercial aircraft. The term "target waypoint", as employed herein, is intended to convey any chosen point along a flight trajectory after Top of Descent. For example, the target waypoint could be a metering fix adjacent to an arrival airport, the airport itself, or any other spatial location during descent towards a landing site.

The first step in the process, shown in FIG. 2 as box 10, is to acknowledge or to determine in the flight deck a Scheduled Time of Arrival (STA) for the target waypoint.

At step 20, the pilot, or alternatively an automatic system, sets a Required Time of Arrival (RTA)=STA for that target waypoint, and the RTA function is then activated in the FMC.

At step 25, the FMC determines for the first time a trajectory that satisfies ETA=RTA at the target waypoint (within a given small tolerance), and the aircraft adopts the resulting cruise speed.

At step 30, the RTA function kicks off the main cyclical process to control the trajectory of the aircraft until the target waypoint is reached. The FMC periodically predicts the aircraft trajectory using the current scheduled speeds. In commercial flight, the flight trajectory includes several different phases. In a so-called cruise phase, the aircraft flies at a relatively high and broadly constant altitude. In this cruise phase, flight speed is determined by a Mach number, being a ratio between the aircraft airspeed and the speed of sound, and the aircraft then is said to fly in "Mach mode". When the aircraft approaches a landing site, for example 100 or so nautical miles from an airport, the aircraft starts its descent. The point at which the aircraft starts its descent is known as the Top of Descent (TOD).

The first part of the aircraft's descent towards the airport is also typically flown in Mach mode. For example, in terms of distance from TOD to the airport or to a metering fix (being a waypoint close to the airport), approximately one quarter of the descent may be flown in Mach mode. After that, the aircraft switches into Calibrated Air Speed (CAS) mode for the final part of the descent to the metering fix or airport. During CAS mode, FMC controls the aircraft's speed so that the CAS follows a given CAS target.

Both Mach mode and CAS mode will be familiar to those skilled in the art and will not be described further. Moreover, it will be understood that a 25%:75% split of the descent between Mach mode and CAS mode is simply by way of example. The specific proportion of the descent that is flown in Mach mode will depend on the Mach/CAS transition altitude, which depends in turn upon a wide range of descent conditions. The consequence is that the proportion of the descent flown in Mach mode might be only 20%, or even lower, or as much as 33% or even higher, and may indeed change during the cruise and/or even on descent, since speeds, wind predictions and other external factors may change during the flight. However, in general terms, the majority (greater than 50%) of the descent will be flown in CAS mode rather than Mach mode, more typically between about two thirds and four fifths (66% to 80%) and most typically around 75%. Returning to FIG. 2, at step 25, the FMC calculates a variety of trajectories using different cruise and descent speeds. Then, for the first time after the RTA function activation, the FMC selects a trajectory that implies an arrival time at the target waypoint equal to the RTA (within a given small tolerance). Subsequently, the aircraft adopts the speeds associated to that trajectory.

Following step 25, the RTA function kicks off the main cyclic process that will not be abandoned while the RTA function is active. At step 30, the FMC updates the trajectory predictions at intervals with the given cruise and descent speeds at that moment. Once the prediction is completed, an Estimated Time of Arrival (ETA) to the target waypoint is obtained.

Next, at step 40, the FMC determines if |RTA−ETA|>DT, where DT is a Difference Threshold. As will be explained in further detail in connection with FIG. 4 in particular below, the Difference Threshold may vary over the course of the flight trajectory, and more specifically may become smaller as the aircraft approaches TOD and the target waypoint, or alternatively DT may be held constant over some or the entire flight trajectory. As may be seen from FIG. 2, if |RTA−ETA|<DT at a given position, the FMC does nothing to the planned flight trajectory and aircraft speed at that time.

So far, the method is in accordance with the functionality of an FMC representing the state of the art.

However, if |RTA−ETA|>DT, then at step 50 the FMC determines whether the aircraft is descending or not, that is, whether it has passed TOD. At step 60, if the aircraft is not descending and is thus still in the cruise phase, the FMC calculates a variety of new trajectories using different Mach cruise speeds. However, in this case, descent speeds, both in the Mach mode representing the first part of the descent trajectory, and in the CAS mode representing the remainder of the descent trajectory, are left unchanged. Then, the FMC selects the trajectory that implies an ETA equal to the RTA at the target waypoint (within a given small tolerance).

By decoupling the cruise phase from the descent phase and iterating around Mach number only for arrival time predictions during the cruise phase, the time deviation upon arrival at top of descent is typically smaller than in the prior art flight management strategy. This in turn requires fewer and/or smaller adjustments to the flight trajectory during descent. This is beneficial because speed adjustments during the cruise phase are relatively straightforward to execute, requiring simply an adjustment of applied thrust to the aircraft. These adjustments during descent, on the other hand, involve a difficult correction of total energy, both speed and vertical path change. Recapturing the vertical path complicates the speed adjustment, and vice versa. Hence, minimising the trajectory errors during descent is beneficial.

Referring again to FIG. 2, if at step 50 the aircraft is descending, then at step 70, the FMC calculates a variety of new trajectories using different descent speeds, either in Mach mode or CAS mode. Then, the FMC selects the trajectory that implies an ETA equal to the RTA at the target waypoint (within a given small tolerance).

Once the FMC has completed its calculations at step 60 or step 70 for the cruise or descent phases respectively, then, finally at step 80, the new trajectory and associated flight plan is executed and a new aircraft speed is commanded. At this point, the control loop reverts to step 30 again.

Figure 3:
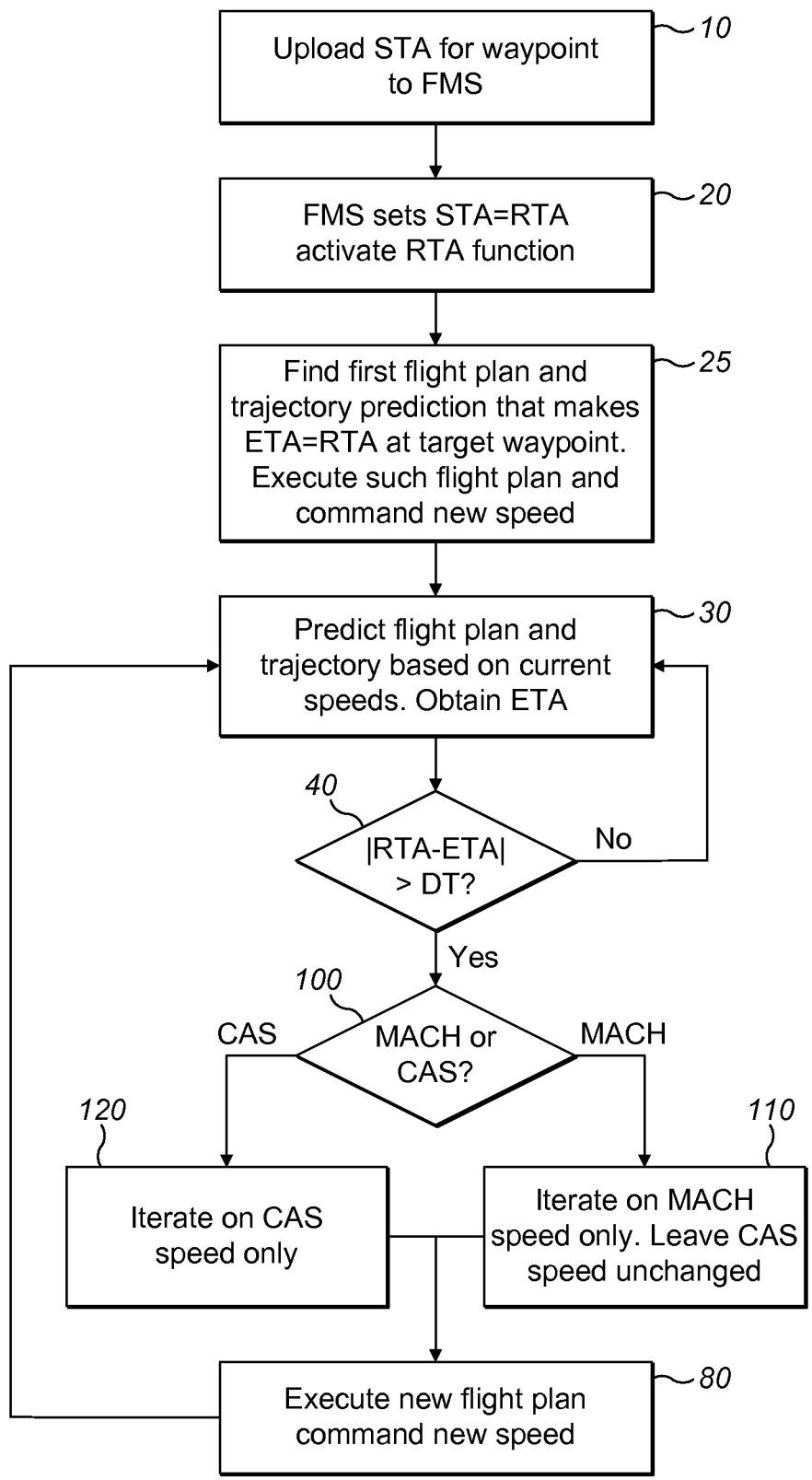
FIG. 3 shows a flow chart of a method for controlling the arrival of an aircraft at a target waypoint, in accordance with a second exemplary embodiment.

FIG. 3 shows an alternative technique for controlling the time of arrival of an aircraft at a target waypoint. Several of the steps correspond with the steps in FIG. 2 and have therefore been labelled with like reference numerals.

In FIG. 3, as with FIG. 2, the control technique starts at step 10 with the uploading of an STA for a target waypoint, to the FMC. At step 20, the FMC sets RTA=STA and activates an RTA function. At step 25, the FMC determines for the first time a trajectory that satisfies ETA=RTA at the target waypoint (within a given small tolerance) and the aircraft adopts the resulting cruise speed.

Next, at step 30, the FMC periodically predicts the trajectory and associated flight plan using the current speed schedule (cruise Mach/descent speed). Once the prediction is completed, an estimated time of arrival (ETA) to the target waypoint is obtained.

Again at step 40, |RTA−ETA| is compared with a Difference Threshold (DT). If |RTA−ETA|<DT, then no adjustments to the flight trajectory are made and the control loop reverts to step 30 again.

If, on the other hand, |RTA−ETA|>DT, then, at step 100, the FMC determines whether the aircraft is flying in Mach mode or CAS mode. As explained in connection with FIG. 2 above, in commercial flight, Mach mode occurs during the relatively high, constant altitude cruise phase and also during the first part of the descent phase. As may be seen in FIG. 3, if the FMC determines that the aircraft is flying in Mach mode then, at step 110, the FMC calculates a variety of new trajectories using different Mach cruise speeds. The CAS is left unchanged. Then, the FMC selects the trajectory that implies an ETA equal to the RTA at the target waypoint (within a given small tolerance). On the other hand, if the FMC determines that the aircraft is in CAS mode, during the latter part of the descent, then the CAS is adjusted instead (step 120) in order to find the trajectory that implies an ETA equal to the RTA at the target waypoint (within a given small tolerance).

Finally, at step 80 of FIG. 3, the new trajectory and associated flight plan is executed and a new flight speed is commanded, based upon the results of iteration in steps 110 or 120 respectively.

Thus, in summary, in the method illustrated by FIG. 2, the cruise phase and descent phase are decoupled, whereas in the method of FIG. 3, the cruise and the first part of the descent phase, that is, that part of the flight wherein the aircraft flies in Mach mode is decoupled from the final part of the descent wherein the aircraft flies in CAS mode.

Figure 4:
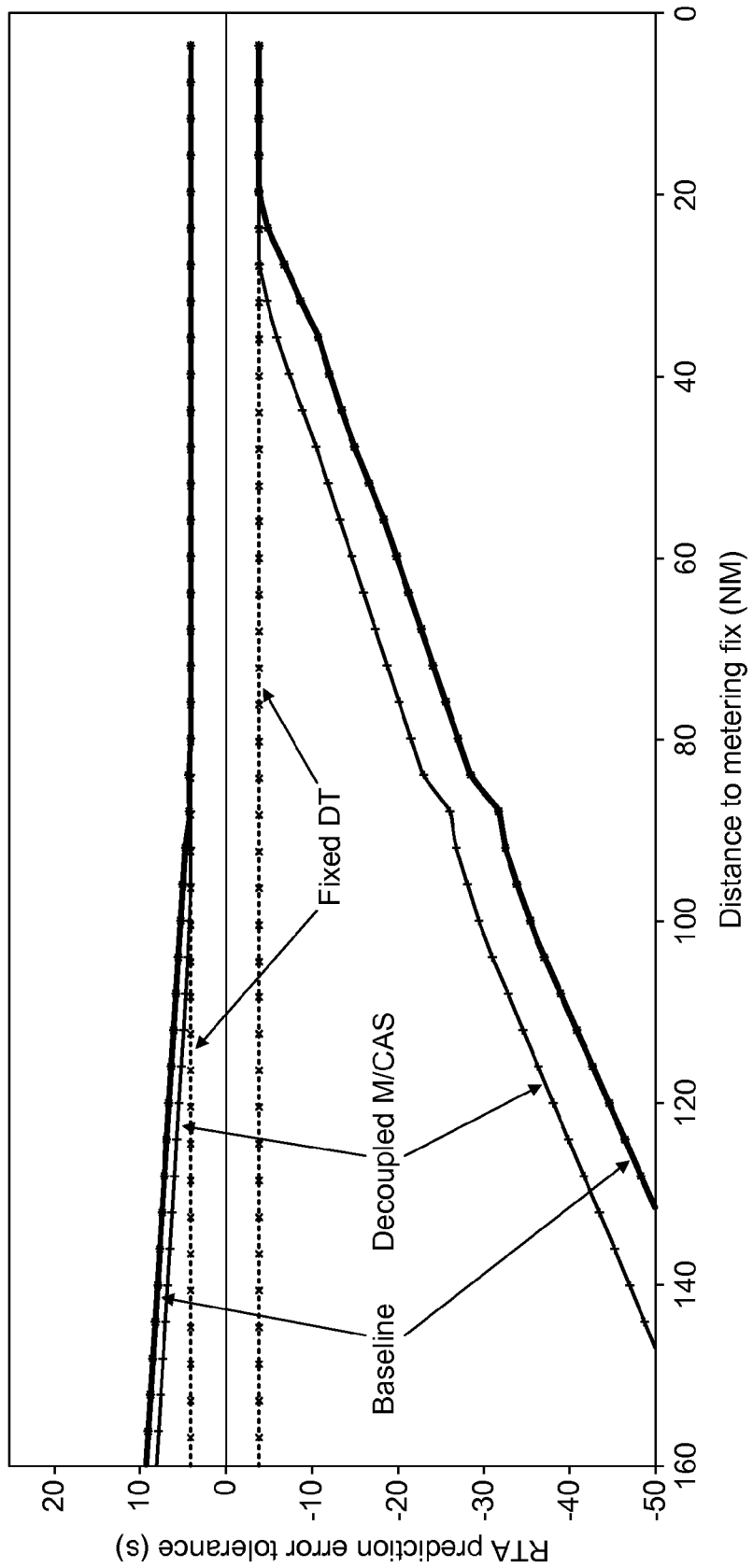
FIG. 4 shows a plot of various RTA prediction error tolerances as a function of distance to the metering fix.

FIG. 4 shows a plot of RTA prediction error tolerance, in seconds, versus distance to the metering fix. The dead band of predicted time error DT decreases, in accordance with state of the art control strategies, as the aircraft approaches the metering fix. This means that the probability of early speed corrections during the flight trajectory, and in particular during the cruise phase, is small.

The solid black lines in FIG. 4 labelled "baseline" represent the upper and lower limits of DT for a prior art aircraft flight control strategy, in which the flight trajectory is adjusted based upon an uncoupled CI criterion only. It will be seen that the shape of the dead band of predicted time error is generally funnel-shaped.

The lighter lines labelled "decoupled M/CAS" in FIG. 4 represent the dead band of predicted time error DT for the method described in connection with FIG. 3 above, wherein the part of the aircraft's flight in Mach mode is decoupled from the latter part of the descent, during which the aircraft flies in CAS mode. It will be seen, from FIG. 4, that the decoupling of the two parts of the flight permits the dead band to be slightly narrower than with the prior art control strategy.

In accordance with a further aspect, however, the margin of prediction error tolerance may be reduced still further, from the funnel-shaped dead band, to a tube-shaped dead band labelled "fixed DT" in FIG. 4. Specifically, the imposition of a constant value for the threshold DT will result in more frequent adjustments to the aircraft flight speed during the cruise phase of flight. However, as has been explained, changes to the aircraft speed during the cruise phase are relatively straightforward to implement compared with changes to the flight trajectory during descent. By constraining the aircraft speed more tightly to an RTA early on in the flight trajectory, fewer adjustments are anticipated later on during the flight and in particular during the descent phase.

Figure 5A:
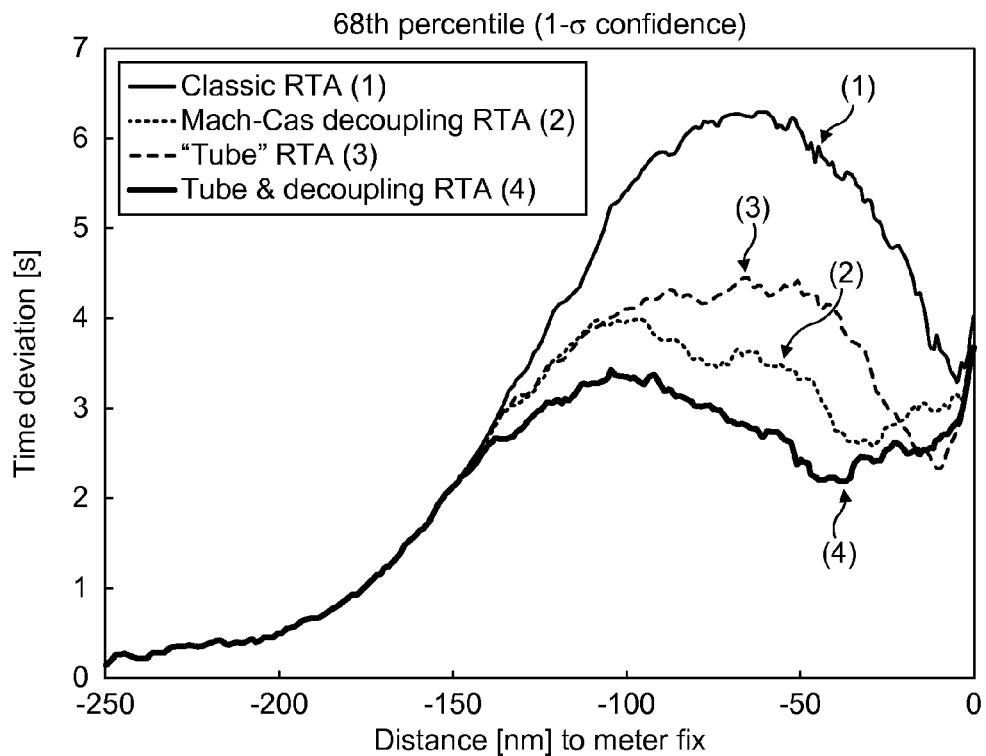
FIG. 5a shows the 1-sigma confidence ($68^{th}$ percentile) and FIG. 5b shows the 2-sigma confidence ($95^{th}$ percentile) time deviations, respectively, as a function of distance to the metering fix, for a prior art flight trajectory control algorithm and for various flight trajectory control techniques in accordance with an embodiment.
Figure 5B:
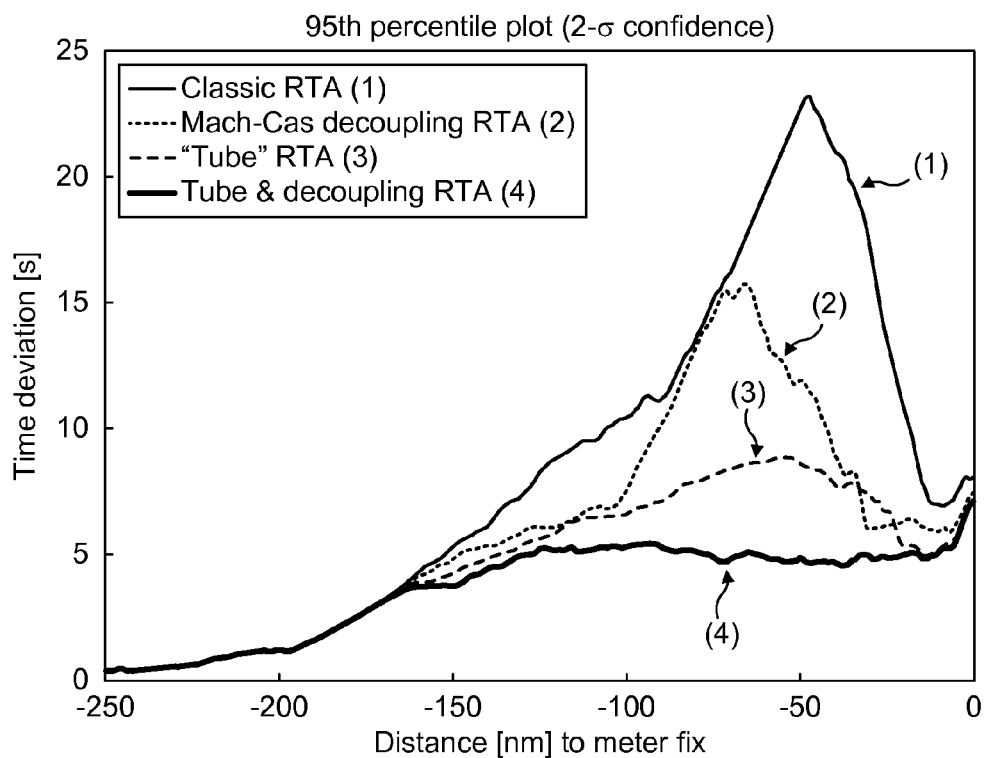

FIG. 5 shows comparative time deviations |RTA−ETA| as a function of distance from metering fix, for (1) the prior art control strategy in which Mach mode and CAS mode are not decoupled and the FMC iterates on CI only; (2) a Mach mode/CAS mode decoupling (the method of FIG. 3); (3) the imposition of a constant DT to the prior art control strategy; and (4) both a constant DT and decoupling of the Mach mode and CAS mode of FIG. 3. FIG. 5A shows the time deviation at a $68^{th}$ percentile (1-sigma confidence), and FIG. 5B shows the $95^{th}$ percentile (2-sigma confidence).

Of note is that, in the prior art control strategy (1), most of the time deviation accumulates before TOD. Both at the 68% and 95% level of statistical confidence, clear benefit from the decoupling of the first and second flight phases is apparent. At the 95% level of statistical confidence, in particular (FIG. 5b), a very strong performance is exhibited when both the constant (tube-shaped) dead band DT and the Mach mode/CAS mode decoupling is employed. Here (line (4) of FIG. 5b), the ETA along the whole of the flight is met to within about 5 seconds.

FIG. 6 shows, again respectively for (1) the prior art control strategy (no decoupling of Mach and CAS modes), (2) the decoupled Mach mode/CAS mode, (3) the constant DT applied to the prior art control strategy, and (4) the constant DT applied to the decoupled Mach mode/CAS mode, the number of speed adjustments, averaged per flight.

Figure 6A:
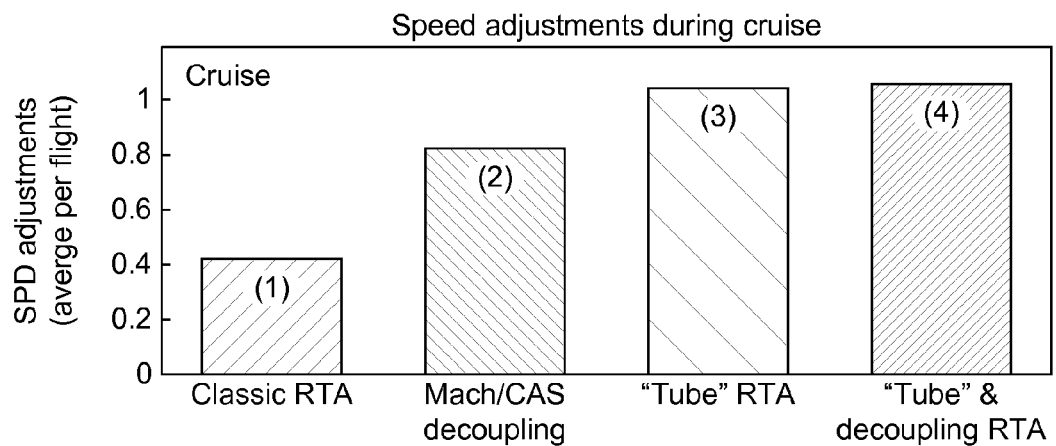
FIGS. 6a, 6b and 6c show, respectively, the number of speed adjustments per flight during the cruise phase, the descent phase, and during the whole of the flight, for a prior art flight trajectory control algorithm and for various flight trajectory control techniques in accordance with various embodiments.
Figure 6B:
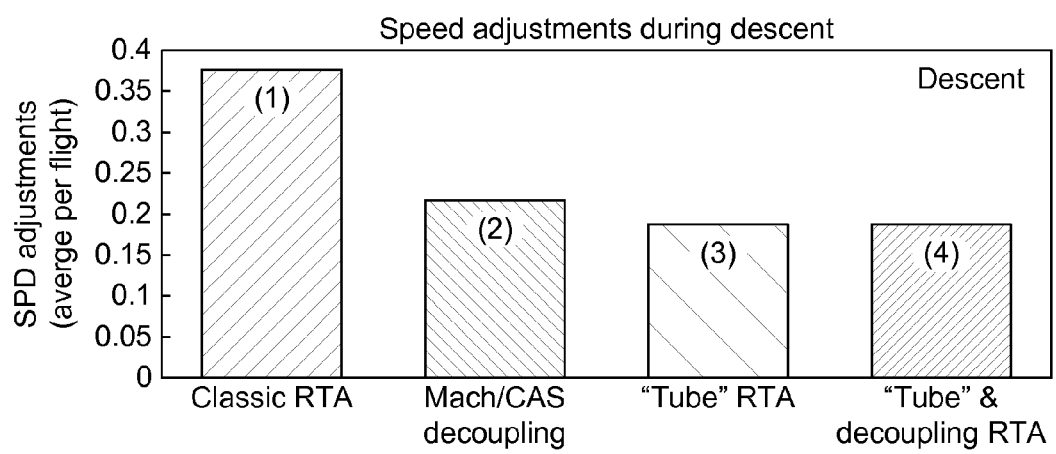
Figure 6C:
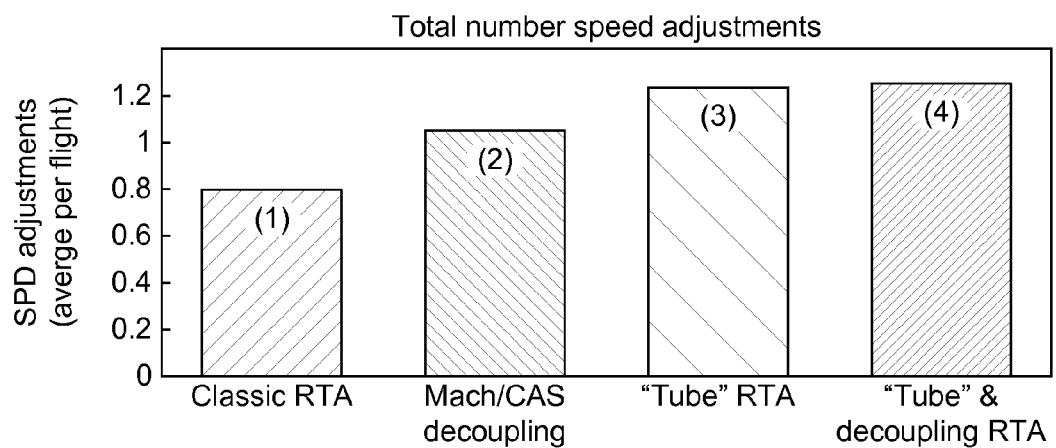

Specifically, FIG. 6a shows the number of speed adjustments averaged per flight during the cruise phase. FIG. 6b shows the number of speed adjustments during the descent phase (including both the initial part of the descent, flown in Mach mode, and the latter part of the descent flown in CAS mode). FIG. 6c shows the total number of speed adjustments, again averaged per flight, for the four different control strategies. Of note is the increase in the number of adjustments in the cruise phase for each of control strategies (2), (3) and (4) relative to control strategy (1) i.e., the prior art control strategy in which the FMC iterates using cost index without any decoupling of the flight phases. However, as seen in FIG. 6b, there is a consequential significant reduction in the number of speed adjustments during the descent phase for each of the control strategies (2), (3) and (4) relative to the prior art control strategy (1). Although, as seen from FIG. 6c, there is an overall increase in the number of speed adjustments for the control strategies (2), (3), and (4) relative to the prior art control strategy (1), it is to be appreciated that the overall increase is of a consequence of additional adjustments in the cruise phase, where speed changes are relatively straightforward to implement, rather than in the descent phase.

Although some specific embodiments have been described, it is to be understood that these are by way of example only and are not to be considered limiting. Various modifications will be apparent to the skilled reader.

All references, including publications, patent applications, and patents, cited herein are hereby incorporated by reference. The description of certain embodiments as "preferred" embodiments, and other recitation of embodiments, features, or ranges as being preferred, is not deemed to be limiting, and the claims are deemed to encompass embodiments that may presently be considered to be less preferred. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. The description herein of any reference or patent, even if identified as "prior," is not intended to constitute a concession that such reference or patent is available as prior art against the present disclosure.

What is claimed is:
1. A method of controlling the arrival of an aircraft at a target waypoint, comprising:
   (a) defining a required time of arrival (RTA) at the target waypoint;
   (b) obtaining a prediction of the aircraft trajectory and an estimate of time of arrival (ETA) of the aircraft at the target waypoint, each estimate being carried out at an intermediate waypoint prior to the target waypoint, wherein a first plurality of intermediate waypoints lies within a first, relatively higher altitude phase of the aircraft flight trajectory to the target waypoint and wherein a second plurality of intermediate waypoints lies within a second, relatively lower altitude phase of the aircraft flight trajectory to the target waypoint;
   (c) calculating a difference between RTA and ETA for each intermediate waypoint;
   (d) determining if |RTA−ETA| exceeds a difference threshold (DT) for each intermediate waypoint;
   (e) where the intermediate waypoint lies within the first relatively higher altitude phase of the aircraft flight trajectory, and where |RTA−ETA|>DT, establishing modifications to the commanded flight speeds during the first flight phase while maintaining, unmodified, flight speeds of the predicted aircraft trajectory during the second flight phase;

(f) where the intermediate waypoint lies within the second relatively lower altitude phase of the aircraft flight trajectory, and where |RTA−ETA|>DT, establishing modifications to the commanded flight speeds during the second flight phase; and (g) executing a new trajectory and associated flight plan based upon the established modifications to the commanded flight speeds, so as to command the aircraft to follow the new speed schedule.

2. The method of claim 1, wherein the first relatively higher altitude phase of the aircraft flight trajectory comprises a cruise phase but substantially none of a descent phase following a Top of Descent (TOD) position.

3. The method of claim 2, wherein the step (e) comprises establishing modifications to a Mach number during the cruise phase.

4. The method of claim 2, wherein the second, relatively lower altitude phase of the aircraft flight trajectory comprises substantially only the descent phase following the TOD position.

5. The method of claim 4, wherein the step (f) comprises establishing modifications to a Calibrated Air Speed (CAS) during the descent phase.

6. The method of claim 5, wherein the step (f) also comprises establishing modifications to a Mach number during the descent phase.

7. The method of claim 5, wherein the step (f) comprises establishing modifications to the CAS during the final descent segment that is executed at the resulting CAS prior to the target waypoint.

8. The method of claim 6, wherein the step (f) comprises establishing modifications to the Mach number during the initial descent segment that is executed at the given Mach number prior to the target waypoint.

9. The method of claim 1, wherein the first, relatively higher altitude phase of the aircraft flight trajectory comprises a cruise phase and a first relatively higher altitude part of a descent phase following a Top of Descent (TOD) position.

10. The method of claim 9, wherein the first, relatively higher altitude phase of the aircraft flight trajectory comprises the part of the flight trajectory in which the aircraft flies in Mach mode.

11. The method of claim 9, wherein the second, relatively lower altitude phase of the aircraft flight trajectory comprises a second, relatively lower altitude part of the descent phase.

12. The method of claim 11, wherein the second, relatively lower altitude part of the descent phase comprises the part of the descent phase during which the aircraft flies in CAS mode.

13. The method of any of claim 9, wherein the first relatively higher altitude part of the descent phase represents less than half of the distance between TOD and the target waypoint.

14. The method of claim 1, wherein the difference threshold (DT) varies between intermediate way points during the first relatively higher altitude phase.

15. The method of claim 14, wherein the difference threshold (DT) decreases with decreasing distance from the target waypoint, for at least a part of the first relatively higher altitude phase which is most distant from the target waypoint.

16. The method of claim 14, wherein the difference threshold (DT) is constant during at least a part of the second, relatively lower altitude phase of the aircraft flight trajectory that is closest to the target waypoint.

17. The method of any of claim 1, wherein the difference threshold (DT) is fixed across both the first and the second phase of the aircraft flight trajectory.

\* \* \* \* \*